US009695930B2

(12) United States Patent
Deutsch et al.

(10) Patent No.: US 9,695,930 B2
(45) Date of Patent: Jul. 4, 2017

(54) TRANSMISSION ASSEMBLY

(71) Applicant: Ford Global Technologies, LLC, Dearborn, MI (US)

(72) Inventors: Laurence Andrew Deutsch, Farmington Hills, MI (US); Gregory Daniel Goleski, Rochester Hills, MI (US); Jeffrey Edward Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 14/736,960

(22) Filed: Jun. 11, 2015

(65) Prior Publication Data

US 2016/0363217 A1   Dec. 15, 2016

(51) Int. Cl.
| F16H 61/02 | (2006.01) |
| F16D 55/36 | (2006.01) |
| F16D 13/58 | (2006.01) |
| F16H 3/46 | (2006.01) |
| F16H 57/02 | (2012.01) |
| F16H 63/06 | (2006.01) |
| F16H 63/30 | (2006.01) |
| F16D 13/74 | (2006.01) |
| F16D 25/0638 | (2006.01) |
| F16D 13/52 | (2006.01) |

(52) U.S. Cl.
CPC ......... *F16H 61/0265* (2013.01); *F16D 13/58* (2013.01); *F16D 55/36* (2013.01); *F16H 3/46* (2013.01); *F16H 57/02* (2013.01); *F16H 63/065* (2013.01); *F16H 63/3026* (2013.01); *F16D 13/52* (2013.01); *F16D 13/74* (2013.01); *F16D 25/0638* (2013.01)

(58) Field of Classification Search
CPC .. F16H 2003/008; F16H 61/0265; F16H 3/46; F16H 63/065; F16H 2063/025; F16D 13/58
See application file for complete search history.

(56) References Cited

U.S. PATENT DOCUMENTS 5,647,467 A   7/1997   Yamauchi
6,206,163 B1 *   3/2001   Schneider ........... F16D 25/0638
                                                           192/113.3
(Continued)

FOREIGN PATENT DOCUMENTS

EP        1585907 A2    10/2005
JP   WO 2014061234 A1 *   4/2014   ........... F16D 25/063

*Primary Examiner* — Jacob S Scott
*Assistant Examiner* — Timothy M Hannon
(74) *Attorney, Agent, or Firm* — James Dottavio; Brooks Kushman P.C.

(57) ABSTRACT

Two brakes of a transmission utilize the transmission front support as a clutch housing. One brake, which selectively holds a sun gear against rotation, is located on the inside of a cylindrical wall of the front support. A second brake, which selectively holds a ring gear against rotation, is located on the outside of the cylindrical wall. The clutch pack of the inner brake is splined to the inner surface of the cylindrical wall. The reaction plate of the first clutch pack includes radial fingers that extend between axial fingers of the cylindrical wall. The portion of the reaction plate that extends to the outer side of the cylindrical wall provides a reaction for a return spring of the outer brake.

6 Claims, 2 Drawing Sheets

(56) References Cited

U.S. PATENT DOCUMENTS

| | | | |
|---|---|---|---|
| 7,036,645 B2 | 5/2006 | Sowul et al. | |
| 7,896,145 B2 | 3/2011 | Kato et al. | |
| 8,297,422 B2 | 10/2012 | Arnold et al. | |
| 9,255,634 B2* | 2/2016 | Sasaki | F16D 25/063 |
| 2011/0308911 A1* | 12/2011 | Heitzenrater | F16D 13/648 |
| | | | 192/66.32 |
| 2015/0337958 A1* | 11/2015 | Iwasaki | F16H 57/10 |
| | | | 475/146 |

\* cited by examiner

TRANSMISSION ASSEMBLY

TECHNICAL FIELD

This disclosure relates to the field of automatic transmissions for motor vehicles. More particularly, the disclosure pertains to the structure and method of assembly of shift elements.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns. A number of gearing elements, such as planetary gear sets, are interconnected with the input shaft, output shaft, and housing by a number of shift elements such as brakes and clutches. Various transmission speed ratios are established by selectively engaging various subsets of the shift elements.

One common type of shift element is a hydraulically actuated multi-plate wet friction clutch. A clutch pack includes a number of friction plates having friction material interleaved with a number of separator plates. The friction plates are splined to one of the elements to be selectively coupled by the shift element and the separator plates are splined to the other element. To engage the clutch, hydraulic pressure is applied to a piston which, in turn, applies axial force to a separator plate on one end of the clutch pack. The separator plate on the opposite end of the clutch pack is called the reaction plate. The reaction plate is held axially to provide a reaction force such that the force from the piston squeezes the friction plates between the separator plates. When the hydraulic pressure is released, a return spring pushes the piston away from the clutch pack to disengage the shift element.

SUMMARY OF THE DISCLOSURE

A transmission includes two brakes which utilize a transmission front support fixed to the transmission case as a clutch housing. An inner brake includes a first clutch pack including a reaction plate splined to the front support. An outer brake includes a second piston configured to slide within the front support to compress a second clutch pack, which may be splined to the transmission case. A return spring arrangement for the second piston reacts against the reaction plate of the first brake. The transmission may also include a planetary gear set wherein the inner brake selectively holds the sun gear against rotation and the outer brake selectively holds the ring gear against rotation.

A shift element module includes a housing having a cylindrical wall. The housing may be a front support of a transmission. A first clutch pack is splined to an inner side of the wall. A first piston, which may be radially inside the cylindrical wall, compressed the first clutch pack. A return spring arrangement for a second piston reacts against a reaction plate of the first clutch pack. The reaction plate may include radial fingers which extend through axial fingers of the cylindrical wall to provide a reaction point on the outer side of the wall for the return spring assembly. The housing may define passageways to convey fluid to engage the shift elements.

A transmission is assembled by assembling a shift element module and then inserting the shift element module into a transmission case. The shift element module is assembled by inserting two pistons into a housing, one on an inner side of a cylindrical wall and the other on an outer side of the cylindrical wall. A return spring arrangement for the outer piston is inserted after the outer piston is inserted. A clutch pack associated with the inner piston is splined to an inner surface of the cylindrical wall after the inner piston is inserted. The return spring arrangement is compressed while inserting the reaction plate of the clutch pack. Then, the reaction plate is secured axially to the cylindrical wall with a snap ring.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A discrete ratio transmission has a gearing arrangement that selectively imposes a variety of speed ratios between an input shaft and an output shaft.

A group of rotating elements are fixedly coupled to one another if they are constrained to rotate at the same speed about the same axis in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate about the same axis at the same speed whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

Figure 1:
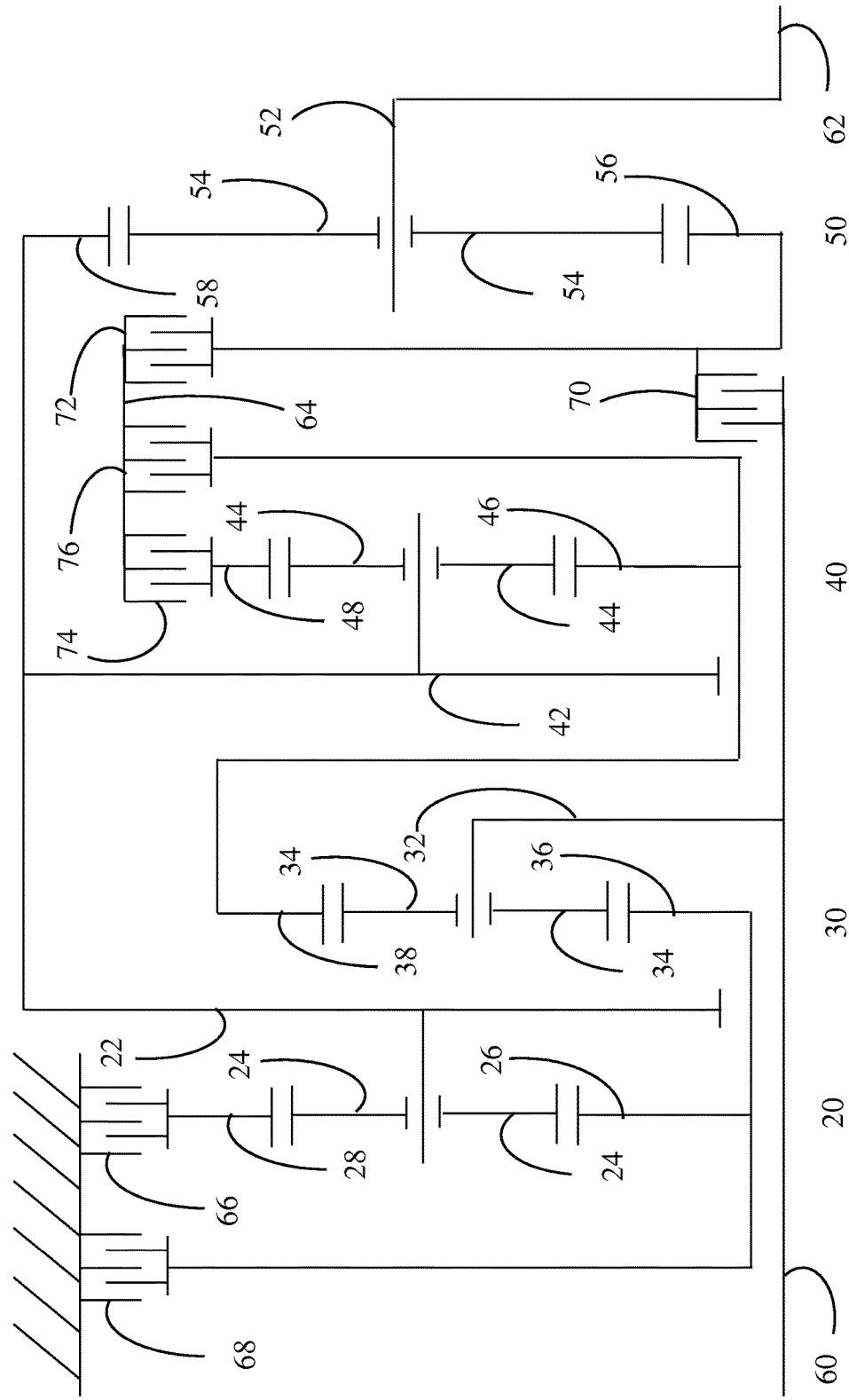
FIG. 1 is a schematic diagram of a transmission gearing arrangement.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A suggested ratio of gear teeth for each planetary gear set is listed in Table 1.

TABLE 1

| | |
|---|---|
| Ring 28/Sun 26 | 2.20 |
| Ring 38/Sun 36 | 1.75 |
| Ring 48/Sun 46 | 1.60 |
| Ring 58/Sun 56 | 3.70 |

Sun gear 26 is fixedly coupled to sun gear 36; carrier 22, carrier 42, and ring gear 58 are mutually fixedly coupled; ring gear 38 is fixedly coupled to sun gear 46; input shaft 60 is fixedly coupled to carrier 32; and output shaft 62 is fixedly coupled to carrier 52. Ring gear 28 is selectively held against rotation by brake 66 and sun gears 26 and 36 are selectively held against rotation by brake 68. Input shaft 60 is selectively coupled to sun gear 56 by clutch 70. Intermediate shaft 64 is selectively coupled to sun gear 56 by clutch 72, selectively coupled to ring gear 48 by clutch 74, and selectively coupled to ring gear 38 and sun gear 46 by clutch 76.

As shown in Table 2, engaging the clutches and brakes in combinations of four establishes ten forward speed ratios and one reverse speed ratio between input shaft 60 and output shaft 62. An X indicates that the clutch is required to establish the speed ratio. An (X) indicates the clutch can be applied but is not required. In 1$^{st}$ gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

| | 66 | 68 | 70 | 72 | 74 | 76 | Ratio | Step |
|---|---|---|---|---|---|---|---|---|
| Rev | X | X | | X | X | | −4.79 | 102% |
| 1$^{st}$ | X | X | X | (X) | | | 4.70 | |
| 2$^{nd}$ | X | X | | X | | X | 2.99 | 1.57 |
| 3$^{rd}$ | X | | X | X | | X | 2.18 | 1.37 |
| 4$^{th}$ | X | | | X | X | X | 1.80 | 1.21 |
| 5$^{th}$ | X | | X | | X | X | 1.54 | 1.17 |
| 6$^{th}$ | X | | | X | X | X | 1.29 | 1.19 |
| 7$^{th}$ | | | X | X | X | X | 1.00 | 1.29 |
| 8$^{th}$ | | X | X | X | X | | 0.85 | 1.17 |
| 9$^{th}$ | | X | X | | X | X | 0.69 | 1.24 |
| 10$^{th}$ | | X | | X | X | X | 0.64 | 1.08 |

Figure 2:
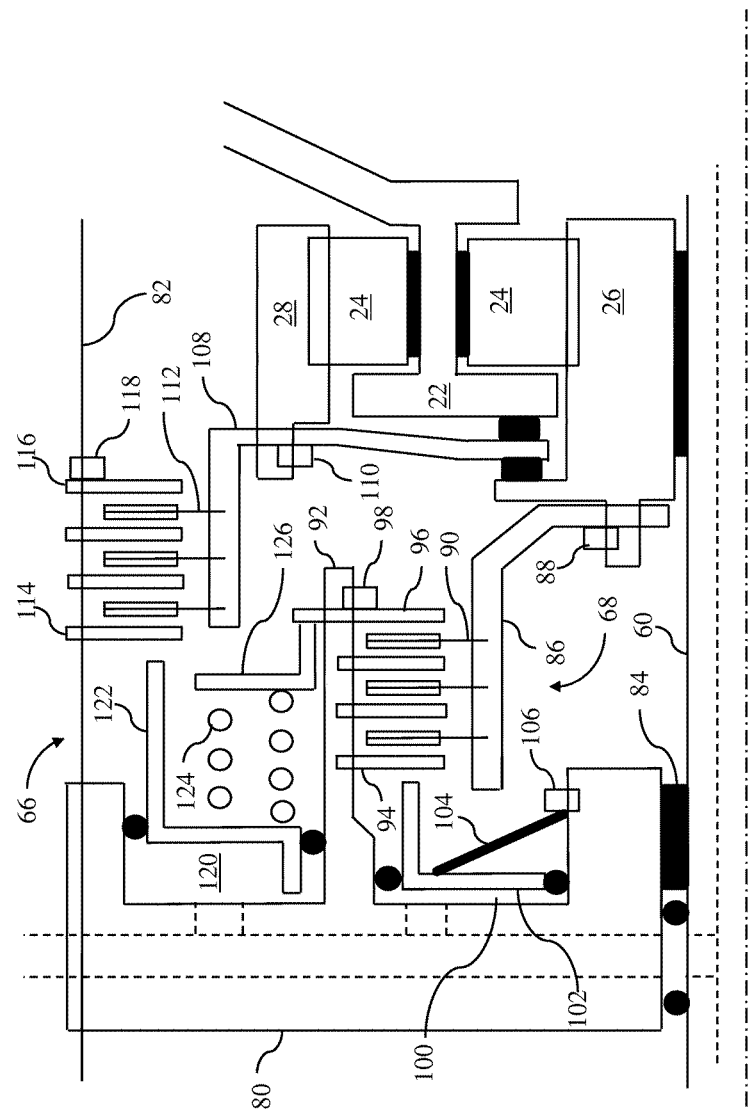
FIG. 2 is a cross sectional view of two brakes of the gearing arrangement of FIG. 1.

FIG. 2 shows a partial cross section of a transmission according to the gearing arrangement of FIG. 1. Specifically, FIG. 2 shows a front section including simple planetary gear set 20 and brakes 66 and 68. Front support 80 is fixed to transmission case 82. Front support 80 and transmission case 82 may be splined, bolted, or fixed by some other mechanism or a combination of mechanisms. Input shaft 60 is supported for rotation relative to front support 80 by bearings 84. In addition to providing support for shaft 60, front support routes fluid from transmission case 82 to one or more channels within shaft 60. The fluid may provide lubrication, may charge a torque converter, may engage a torque converter lock-up clutch, and/or may engage clutches 70, 72, 74, and 76.

Brake 68 selectively holds sun gear 26 against rotation by selectively coupling it to front support 80. Hub 86 is fixed to sun gear 26. Radial fingers on hub 86 intermesh with axial fingers on sun gear 26 and are held in place by snap ring 88 inserted into a groove in the axial fingers. A set of friction plates 90 are splined to an outside surface of hub 86. The spline prevents relative rotation between the friction plates and the hub, but permits some degree of axial movement. A cylindrical wall 92 extends from front support 80 toward gear set 20. A set of separator plates 94 are splined to an inside surface of the cylindrical wall 92 such that they are interspersed with friction plates 90. The endmost separator plate 96 is called a reaction plate because it reacts the apply force when the clutch is engaged. Reaction plate 96 is held in position axially by snap ring 98. The friction plates and separator plates are collectively called a clutch pack.

Brake 68 is engaged by providing pressurized fluid through front support 80 to apply chamber 100. The fluid pressure forces piston 102 to slide to the right and apply axial force to the first separator plate, which may be called a pressure plate. This axial force squeezes the friction plates 90 between separator plates 94. Frictional forces between the friction plates and the separator plates exert torque on the friction plates and separator plates. The torque on friction plates 90 is transferred to sun gear 26 via hub 86. The torque on separator plates 94 is transferred to transmission case 82 via cylindrical wall 92 and front support 80. When the fluid pressure is released, return spring 104 pushes piston 102 back to the left, removing the axial force between the friction plates 90 and separator plates 94. FIG. 2 shows return spring 104 as a Belleville spring. Other types if compression spring may be substituted, such as coil springs or a spring pack assembly including multiple springs arranged in a circle. Return spring 104 reacts against snap ring 106 which is inserted into a groove in front support 80.

Brake 66 selectively holds ring gear 28 against rotation by selectively coupling it to front support 80. Hub 108 is fixed to ring gear 28. Radial fingers on hub 108 intermesh with axial fingers on ring gear 28 and are held in place by snap ring 110 inserted into a groove in the axial fingers. A set of friction plates 112 are splined to an outside surface of hub 108. A set of separator plates 114 are splined to an inside surface of the transmission case 82 such that they are interspersed with friction plates 112. Alternatively, separator plates 144 could be splined to a second cylindrical wall of front support 80. The endmost separator plate 116, called a reaction plate, is held in position axially by snap ring 118.

Brake 66 is engaged by providing pressurized fluid through front support 80 to apply chamber 120. The fluid pressure forces piston 122 to slide to the right squeezing the friction plates 112 between separator plates 114. Frictional forces between the friction plates and the separator plates exert torque on the friction plates and separator plates. The torque on friction plates 112 is transferred to ring gear 28 via hub 108. When the fluid pressure is released, return spring 124 pushes piston 122 back to the left, removing the axial force between the friction plates 90 and separator plates 94. As with return spring 104, various types of compression springs may be used. FIG. 2 shows one coil spring of a spring pack assembly.

In order for return spring 124 to exert axial force on piston 122, it must also exert a reaction force on some other component. Utilizing a snap ring inserted into a groove in cylindrical wall 92 would require increasing the thickness of wall 92. Snap rings require a sufficiently deep groove. The assembly of FIG. 2 avoids the need for a groove in the outer surface of 92. Reaction plate 96 includes a number of radial fingers that extend between axial fingers in cylindrical wall 92. Spring retainer 126 is held axially by the radial fingers of reaction plate 96 which extend beyond the outer surface of cylindrical wall 92. The reaction force of return spring 124 is transferred to front support 80 via retainer 126, reaction plate 96, snap ring 98, and cylindrical wall 92. Spring retainer 126 and reaction plate 96 may be formed as a single part or may be separate parts. Also, spring 124 may be fixed to spring retainer 126 prior to assembly or may be installed separately.

Assembly of the transmission of FIG. 2 may be accomplished by pre-assembling a module including front support 80, brake 68, and a portion of brake 66. Specifically, the module may include piston 122 and return spring 124. The module may then be installed into the transmission. Since rear wheel drive transmissions are typically more narrow near the rear than near the front, components are typically installed from the front (large end), with rearmost components installed first. For a transmission assembled from the front, the module would be installed after gear set 20, friction plates 112, and separator plates 116 have been installed. Front wheel drive transmission may be assembled from either the front or the rear of some combination of the two.

The module is pre-assembled by installing components onto front support 80 from the rear side (the right side in FIG. 2). One possible sequence of installation is i) piston 122, ii) return spring 124, iii) spring retainer 126, iv) piston 102, v) return spring 104, vi) snap ring 106, vii) separator plates 94 alternating with friction plates 90 and ending with reaction plate 96, and viii) snap ring 98. Some variation in this sequence is possible. Spring 104 must be compressed before installing snap ring 106 and spring 124 must be compressed before installing snap ring 98. Some groups of parts may be fastened to one another, either permanently or temporarily, prior to insertion into front support 80. For example, piston 122, return spring 124, and spring retainer 126 may be inserted into a fixture that preloads return spring 124 into a compressed state. The fixture may remain attached as these parts are inserted into front support 80 and then be removed after snap ring 98 is installed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A shift element module comprising:
   a housing having a cylindrical wall;
   a first clutch pack splined to a radially inner side of the wall;
   first and second pistons configured to slide relative to the housing, the first piston configured to compress the first clutch pack; and
   a return spring arrangement reacting against a reaction plate of the first clutch pack on a radially outer side of the wall to apply force to the second piston.

2. The shift element module of claim 1 wherein the housing is a transmission front support adapted for fixation to a transmission case.

3. The shift element module of claim 2 wherein the housing defines passageways to convey pressurized fluid from the transmission case to apply chambers associated with the first and second pistons.

4. The shift element module of claim 1 wherein:
   the cylindrical wall includes a plurality of axial fingers; and
   the reaction plate includes a plurality of radial fingers extending between the axial fingers from the inner side of the wall to the outer side of the wall.

5. The shift element module of claim 1 wherein the return spring comprises:
   a spring retainer having first and second sides, the first side adapted to transfer reaction force to the reaction plate; and
   a plurality of coil springs arranged circumferentially along the second side.

6. The shift element module of claim 5 wherein the spring retainer is rigidly fastened to the reaction plate.

* * * * *